UNITED STATES PATENT OFFICE.

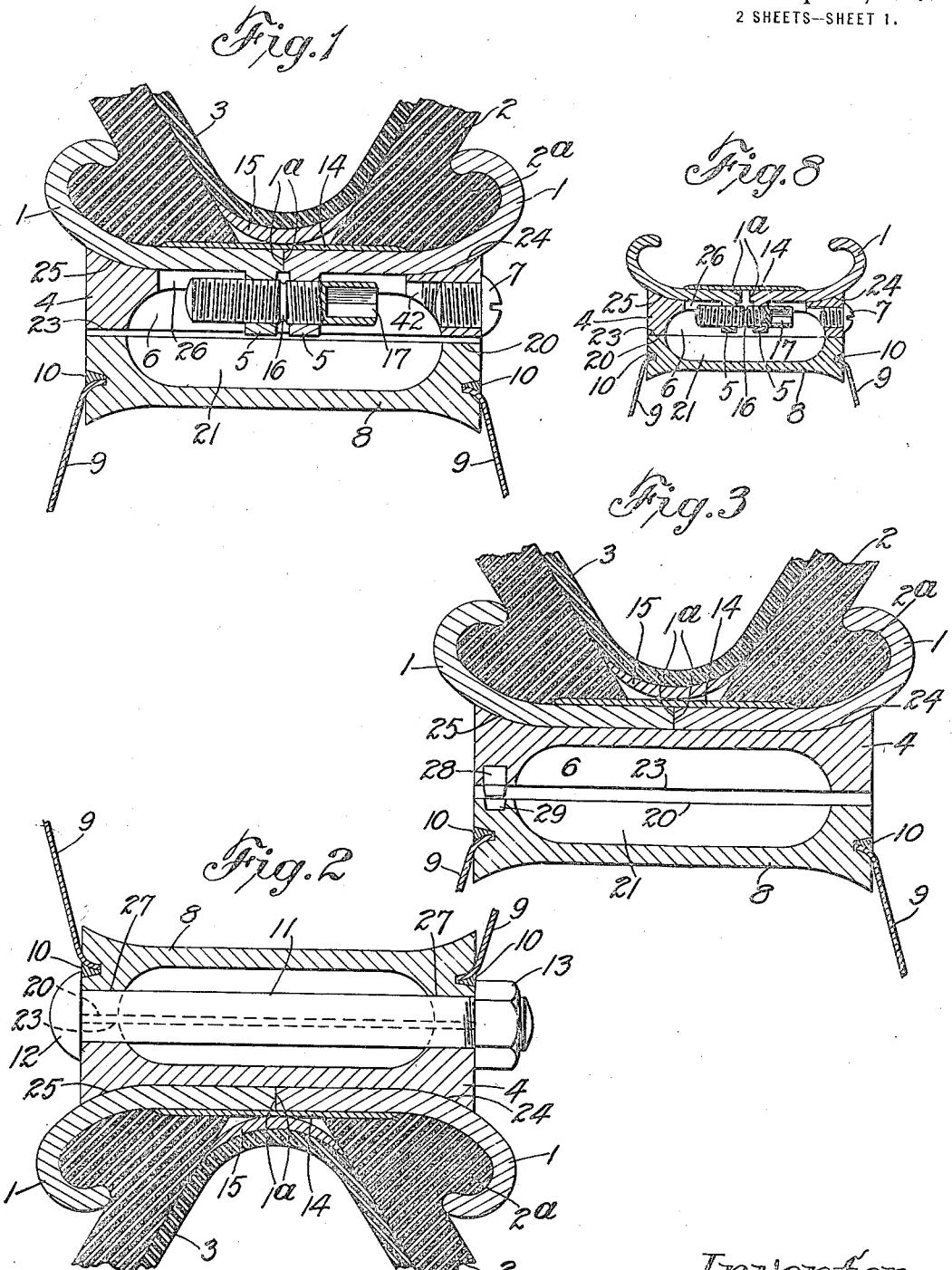

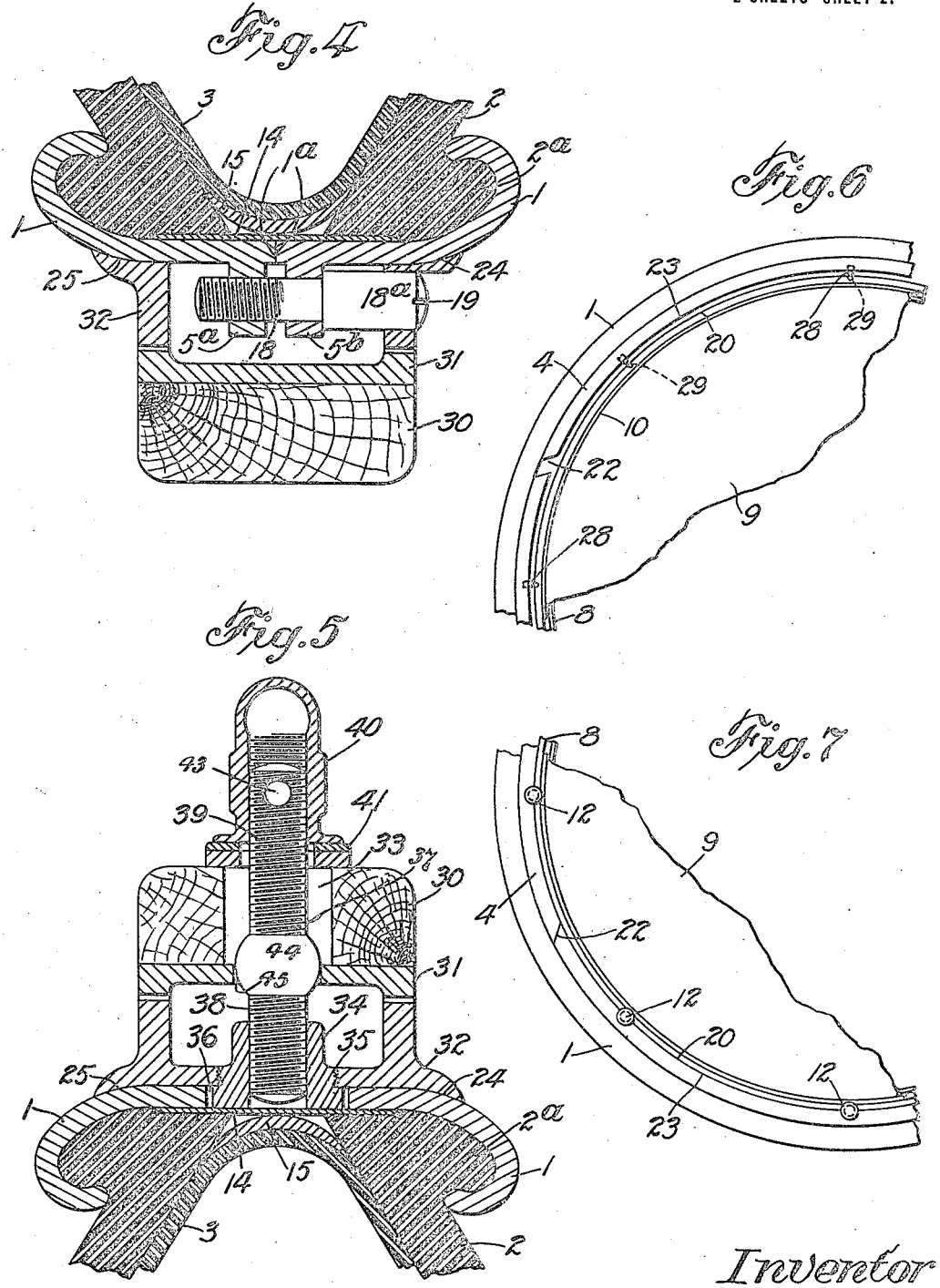

WILLIAM J. P. MOORE, OF NEW YORK, N. Y.

DEMOUNTABLE RIM.

1,239,506.  Specification of Letters Patent.  Patented Sept. 11, 1917.

Application filed April 1, 1916. Serial No. 88,303.

*To all whom it may concern:*

Be it known that I, WILLIAM J. P. MOORE, a citizen of the United States, residing at New York, in the county of New York and State of New York, have invented certain new and useful Improvements in Demountable Rims, of which the following is a specification, reference being had therein to the accompanying drawing.

This invention relates to certain new and useful improvements in demountable rims for wheels intended chiefly for use with automobile and similar vehicles, although the invention in widely applicable to all kinds of wheels with which a removable rim is employed. One object of the invention is to provide a simple and easily-handled rim which can be placed upon wheel or removed therefrom very quickly and without difficulty. There are many other objects held in view which might be mentioned in addition to this principal one. In order to attain the objects in the most practical way, the invention consists essentially of means whereby the pneumatic pressure in the tire carried by the demountable rim may be utilized to aid in clutching or clamping the demountable rim upon the wheel or wheel felly; also the invention comprises the combination of a wheel and a demountable rim adapted to carry a tire, which demountable rim is composed of sections having means for separating them, said means consisting essentially of mechanical devices aided by the pneumatic pressure in the tire, together with a split locking ring or band interposed between the sectional rim and the wheel body and securely locked thereto by the joint action of the mechanical devices for separating the sections of the rim and the air pressure within the pneumatic tire, said locking ring having a curved face against which the curved faces of the rim sections operate; and the invention also comprises numerous details and peculiarities in the construction, arrangement, and combination of the various parts substantially as will be hereinafter described and then more particularly pointed out in the claims.

In the accompanying drawing illustrating my invention:

Figure 1 is a cross-section of my improved demountable rim at one point in its length;

Fig. 2 is a cross-section at a point in the periphery directly opposite to the section of Fig. 1, so that the two figures taken together would make up the cross-section of the entire wheel with the exception of the central member;

Fig. 3 is a cross-section of a modified form of the invention;

Fig. 4 is a cross-section of a further modified form of the invention;

Fig. 5 is another cross-section of a different form of the invention;

Fig. 6 is a partial side view of the form of wheel shown in Fig. 3, the same being broken away;

Fig. 7 is a similar side view of the form of wheel shown in Fig. 1;

Fig. 8 is a cross-section on a reduced scale of the form of the invention indicated in Fig. 1, but showing the parts in the position which they occupy when the rim sections are open and the air pressure is added to the pressure of the screws in expanding the sections of the rim and clamping the locking ring upon the wheel.

Similar characters of reference designate corresponding parts throughout the different figures of the drawing.

Referring first to Figs. 1, 2, and 3, it will be observed that 1, 1 denote the flanged sections of one specimen of clencher rim, that is to say, a circular rim which is divided by a circumferential medial line into two halves, each of which has on its outer edge a curved flange for receiving within it the bead $2^a$ of the outer shoe or casing 2, while the inner edges $1^a$ of these sections 1 are in contact with each other, or may be so, at certain times, while at other times they may be separated for a short distance from each other. Preferably I employ in connection with these meeting edges $1^a$ a thin covering ring 14, although this is not always essential and may be dispensed with. The outer faces of the sections 1 are curved on an arc having any desired radius, but it is preferable to have the curvatures of the two sections 1 substantially equal and uniform. In the drawings I have only represented a portion of the elastic shoe or casing 2, the remainder being broken away for convenience of drawing, and inside of said shoe is any one of the customary kinds of inflatable inner tubes, as 3, a strip of fabric 15 being frequently employed between the tube 3 and the adjacent portions of the walls of the casing 2 nearest to the meeting edges $1^a$; further, it will be noted that the said clencher sections 1 at suitable points on their inner circumference and closely contiguous to the meeting edges 1ª are provided with perforated projections 5, 5 that are internally threaded to enable them to serve as nuts, which projections may be integral with the members 1, or they may consist of small metallic blocks or nuts which are spot-welded or otherwise secured to the members 1. Members 1 will each have a series of these nuts 5 equidistant from each other, say four, or half a dozen, or so, so that the nuts will thus be arranged in pairs whose members are opposite to each other.

Operating in conjunction with each pair of oppositely-located nuts 5, 5 I employ screw devices whose rotation forces the members of each pair of nuts 5 and consequently the meeting edges 1ª, 1ª of the members 1 slightly away from or draws them closely toward each other. One example of this kind of a screw device is shown in Fig. 1, where it is shown to consist of a right and left hand screw 16, whose right hand threads engage one of the nuts 5, and whose left hand threads engage the other nut 5, while the end of the screw device is provided with a square or polygonal opening 17 for the application of a wrench or other device, by means of which the screw 16 is rotated to perform its function. In Fig. 4 I have indicated another form of screw device for the same purpose, the same being designated 18, and having only one kind of threads. These threads engage one of the nuts 5ª while the other nut 5ᵇ is not threaded at all, but is smooth inside and is engaged by a smooth portion of the screw device 18, beyond which smooth portion is another smooth portion 18ª of larger diameter, which has a slotted head 19 by means of which it can be manipulated in the use of a screw driver, it being thus observed that with the form of screw shown in Fig. 4 the screwing action takes place on only one of the nuts 5, while the shoulder on the part 18ª bears against the opposite face of the other nut 5ᵇ, and accordingly as the screw is turned in one direction or the other, the sections 1, 1 will be loosened or tightened, and their meeting edges 1ª, 1ª brought toward or away from each other.

The wheel body proper is composed of a metallic or other fixed rim 8 and a pair of lateral disks 9 that are attached to the fixed rim and also to a central hub, not shown. The method of attaching the disks 9 to the fixed rim 8 varies within wide limits, and that shown consisting of inturning the outer edges of disks 9 and causing them to enter suitable grooves in the fixed rim 8 and holding them therein by rings 10 that are applied in a heated state and allowed to cool and weld the parts together, is only one of many that may be adopted. The outer circumference of the fixed rim 8 has a cylindrical face 20 which may extend from edge to edge of the periphery or may have cylindrical sections near the edges of the periphery, as shown in Figs. 1, 2, and 3, a portion of the intervening material being hollowed out as at 21, for the sake of lightness of construction and also to provide a cavity to receive a part of the operating devices for drawing the clencher sections 1 toward and away from each other, as I have already indicated, but however this outer periphery of the fixed rim may be formed, it will provide in the main a cylindrical face 20 in one or more parts, which cylinder will have its axis passing through the center of the hub of the wheel or axle.

Between the removable and fixed rims is a locking band or ring 4 of a width equal to the width of the fixed rim 8 and of a substantial thickness, said ring being of spring metal and being split at one point in its circumference, as for example, the point 22, which enables the ring 4 to be expanded and collapsed when it is being placed in position. On its inner surface, the ring 4 has a cylindrical face 23 adapted to fit closely over and upon the rim face 20, said cylindrical face being co-axial with the face 20, and the ring 4 being of such size and temper that when it is in its normal position, it will be enough larger than the fixed rim 8 to allow it to be easily slipped over it with a small space between the two cylindrical faces 20 and 23, as is clearly shown in Figs. 1, 2, and 3. On its outer periphery the ring 4 is provided with a shallow concavely curved face or faces which corresponds to the curvature of the outside of the clencher sections 1, 1 that are seated in the outer periphery of said ring 4, it being noted that the radius of the arc of curvature of the outer faces of the sections 1, 1 as they are shown at 24, is the same as the concave curvature near the outer edges of the ring 4, as shown at 25, so that these parts lie closely and neatly together, and the clencher members 1 are adapted to be laterally movable upon the curved faces of the ring 4 without displacing the faces 24 and 25 from intimate contact with each other, whether it be that the sections 1 occupy a position where their meeting edges 1ª are in close contact with each other, or a position where said edges are slightly separated with an intervening space. Further, the ring 4 is lightened by hollowing out its inner face at 6 to form a peripheral cavity which coincides with the cavity 21 in the fixed rim 8 and affords room for the reception of the nuts 5 and operating screws 16, said ring 4 being furthermore provided at proper equidistant points with apertures 26 through which these nuts 5 on the rim sections 1 project inwardly. There will obviously be as many apertures 26 as there are sets of nuts and screws, say four, or half a dozen, or more. Opposite each screw 16, or rather opposite to the angular recess 17, in the end of each screw, is a screw-threaded orifice 42 in the side of the ring 4, which is filled by a screw plug 7 that prevents dust and foreign substances from entering into the cavities 6 and 21 and clogging and injuring the interior parts, but by the removal of these screw plugs 7 access is had for a wrench to the screws 16 for the purpose of turning the same and adjusting them as required.

As the fixed rim 8 of the wheel body and ring 4 have the same lateral width, it will be noted that their outside faces coincide with each other and lie flush, and these outside faces are at right angles to the cylindrical faces 20 and 23. At intervals in the periphery of the wheel, therefore, I provide lateral passages 27 cut partly in the fixed rim 8 and partly in the ring 4, there being, say, half a dozen of such passages, or any other suitable number, for the reception of transverse bolts 11, each having a head 12, which on one side of the wheel fits partly against the outside of the ring 4 and partly against the contiguous outside of the fixed rim 8, while on the other end the screw-threaded end of each of the bolts 11 is provided with a nut 13 which screws tightly against the ring 4 and the adjacent flush part of the fixed rim 8, so that by tightening the bolts 11 after the demountable rim has been placed upon the fixed rim, the ring and fixed rim may be securely locked against any lateral displacement; and furthermore, the fact that the holes 27 through which the bolts pass are cut partly in the fixed rim and partly in the locking ring 8, will prevent any possibility of any circumferential creeping or displacement of the removable rim upon the wheel after it is put into place and the bolts 11 have been inserted and screwed down tightly.

In describing the operation of a device of this character, if we assume that the rim consisting of the clencher sections and the inner ring 4 are assembled together with the locking screws 16 screwed up sufficiently tight so that the meeting edges 1ª are in close contact with each other, the shoe being in position with the beads under the clencher flanges and the inflated tube within the shoe being filled with air of the required pounds of pressure, it will be evident that the rim thus assembled can be readily slipped into place over the wheel body, since at this time the locking ring 4 will be expanded with its split point 22 having its edges separated, and consequently there will be some space between the outer cylindrical periphery of the wheel body and the inner cylindrical periphery of the ring 4. Having thus mounted the removable rim upon the wheel and brought the sides of the removable rim and fixed rim into vertical coincidence with the bolt holes properly registering, the next step is to clamp the demountable rim upon the wheel. This is done by first removing the screw plugs so as to allow access to the bolts 15 which engage the sections of the rim. By turning these one by one in the proper direction, the meeting edges 1ª will be forced apart and in so doing the outer curved faces of the rim sections will ride upon the correspondingly contacting concavely curved faces of the locking ring and cause a collapsing of the latter and a closing of the space between its ends at the split 22, together with a simultaneous seating of the ring with a firm and solid grip around the entire circumference of the felly. The instant that the edges 1ª separate the air pressure in the inner tube will expand the said tube and outer shoe firmly into the slightly loosened flanges of the clencher rim, and such expansion will continue so long as the revolution of the screw 16 continues to separate the edges 1ª of sections 1, and when the ring 4 has been forced tightly against the periphery of the wheel, it will be observed that the clamping force of the rim upon the wheel will consist not only of the positive action of the series of screws 16 acting through parts 1 and 4, but also superadded to this pressure will be the expansive power of the air pressure within the inner tube which will be loaded upon the mechanical clamping effect, so that the result will be a very strong and effective gripping of the wheel by the tire. The utilizing of the air pressure of a pneumatic tire for causing the rim which carries said tire to more tightly grasp the wheel, is entirely novel with me, so far as I am aware, and involves a very important and decided advance in the construction and application of demountable rims. With the mechanical clamping mechanism which I have described consisting of the parts 1, 4, and 16, to be used alone, without the aid of the pneumatic tire, it would be necessary for them to be much heavier and stronger and more difficult to operate, but although it is necessary that they should be sufficiently strong, yet they may be made light and of a material that can be cheap and simple when the device is applied to draw upon the force of the air storage in the tire to supplement the mechanical action of the screws.

In Fig. 3 I have delineated a modification with which the use of these series of transverse bolts 16 is dispensed with, and in lieu thereof the locking ring 4 is provided with a series of any number of dowel pins or tenons 28 which are embedded therein or otherwise secured thereto and whose outer ends are preferably of a frusto-conical shape and adapted to enter a frusto-conical adjacent recess 29 in the fixed rim 8. There may be a series of these pins on one side, as shown in Fig. 3, or on both sides if desired, and there may be as many in the series as preferred, and they may be modified and arranged in various ways as to form and shape. When the rim is off the wheel and the locking ring is expanded, the tips of these dowel pins will be so situated that when the rim is being mounted upon the wheel they will be free from the surface of the cylindrical periphery of the fixed rim 8 without obstructing the movement of the rim in mounting, and can be readily caused to enter their respective recesses when the screws 16 or their equivalents are rotated for the purpose of clamping the rim to the wheel by means of the combined mechanical and pneumatic clamping devices.

In Figs. 4 and 5 I have shown my invention as applied to a wheel having a wooden felly faced with metallic felly bands, but in so far as the other parts are concerned, namely, the clencher sections 1, the locking ring 4, the tire supported by the clencher sections, they are all substantially the same as in the other views of the drawing.

In the modification shown in Fig. 5, 30 denotes the wooden felly of a wheel, to which felly is secured the metallic felly band 31, which is similar to the fixed rim 8 in Figs. 1, 2, and 3, at least to the extent that it has a cylindrical peripheral face over which fits a locking ring 32 having a similar cylindrical face which is adapted to clamp down tightly upon the band 31. The ring 32 is similar in a general way to the ring 4 in the other figures of the drawing, although its shape is slightly different; and arranged in connection with the locking ring 32 are the clencher rim sections 1, the outer shoe or casing 2, having beads 2ª, the inflatable tube 3, and the supplemental strip 15, as also the thin ring 14, which can be employed when desired to cover the slot between the clencher sections 1 when the latter are separated from each other. The main difference between this combination in Fig. 5 and the combination in Figs. 1, 2, and 3, is that instead of using bolts like the bolt 11 located parallel to the axis of revolution of the wheel, I employ bolts 37 located radially of the wheel, said bolts 37 being arranged in a series of four, or half a dozen, or any other suitable number, as may be preferred, and although they may have the function of drawing the members 31 and 32 toward each other, yet their principal use is to properly center them relatively to each other and aline their outer faces, it being noted that in conjunction with the radial bolts 37, the bolts 16 or 18 which are used to separate the clencher sections are used in the same manner as in Figs. 1, 2, and 3. The ring 32 is provided with a suitable number of screw-threaded openings 35 which receive the internally threaded bushings 34 that are screwed tightly in said openings 35, said bushings projecting at one end into openings 36 in the clencher sections 1, 1, said openings 36 being large enough to allow the ends of the bushings 34 to loosely occupy the same. Each bolt 37 has a spherical, globular, or partially globular portion 44, or some equivalent protuberance or flange, which engages an opening 45 in the felly band 31, the diameter of the said globular portion 44 being about the same as the diameter of the opening 45, so that said globular portion may engage the edges of the opening when the bolt 37 is being tightened up. Furthermore, said bolt 37 has a screw-threaded section 38 at one side of the globular part 44, which section engages the internally-threaded bushing 34, and at the other side of the globular part 44 is another threaded portion 39 which passes through an opening 33 in the wooden felly 30, said opening being large enough to receive and accommodate the globular or protuberant part of the bolt in its operation, and said threaded portion 39 having thereon a screw-cap 40 which clamps down against the inner edge of the felly 30, there being preferably one or two washers 41 interposed between the cap 40 and the felly 30. The bolt 37 may be rotated in any suitable way, either by means of a wrench applied to the perforations 43 in the section 39, or in any other way. It will be readily perceived, therefore, that by rotating the bolt 37, the globular part 44 may be caused to bind tightly against the wall of the opening 45 in the band 31, and thus cause the outer faces of the members to be properly alined with each other and kept so, and so that the cylindrical faces of the two parts may be brought into contact, though in order to do this the globular part 44 must be larger than the opening 45 or have a collar larger than said opening.

When the transverse bolts 16 or 18 are loosened and rotated so as to expand the clencher sections 1 and allow the air pressure in the tire to expand, such pressure will assist the action of the bolts 16 in effectually clamping the rim upon the wheel. This clamping is also assisted and strengthened by the action of the radial bolts 37 after the caps 40 are in place on ends 39. These bolts will be first introduced through the several openings 33 and screwed into place before the bolts 16 are operated in order that the globular part 44 may produce the required effect on the rim to properly aline the parts 32 and 31 with respect to each other, thus centering the two parts and causing the outer faces of their side walls to be in proper coincidence and to lie flush with each other in the same way that the side walls in Figs. 1, 2, and 3, are kept flush and properly related by means of the clamping effect of the series of bolts 11.

Many changes may be made in the precise construction and arrangement of the various parts of my invention, for the purpose of making it more practical and useful in its application, and I therefore reserve the liberty, in so far as this can be attained without exceeding the scope of the appended claims, to modify and change and rearrange the details of the invention within wide limits.

Having thus described my invention, what I claim as new and desire to secure by Letters Patent, is:

1. The combination with a wheel, of a demountable rim collapsible to exert a clamping effect when mounted on the wheel, said rim having sections, screw means for separating the sections, and pneumatic means carried by the rim which exerts a clamping effect when the sections of the rim are separated, and clamping means for holding the demountable rim upon the wheel.

2. The combination of a wheel body, a sectional demountable rim, means for drawing the sections together or apart, a curved faced locking ring interposed between the sectional rim and the body, and pneumatic means for effecting a clamping pressure on the locking ring and body when the sections of the rim are separated, and clamping devices for holding the demountable rim upon the wheel body.

3. The combination of a wheel body, a sectional rim, means for drawing the sections of the rim together or apart consisting of screw-devices, a pneumatic tire carried by the rim whose pneumatic pressure aids in separating the sections when they are released by the aforesaid means acting thereon, and a locking ring interposed between the sectional rim and the wheel body, said locking ring having faces corresponding in shape to the faces of the sectional rim that are in contact therewith.

4. The combination of a wheel body, a sectional rim, means for drawing the sections of the rim together or apart, a pneumatic tire carried by the rim whose pressure aids in separating the sections when they are released by the aforesaid means acting thereon, and a collapsible locking ring interposed between the sectional rim and the wheel body, the contacting surfaces of the wheel body and the ring being co-axially cylindrical.

5. The combination of a wheel body, a sectional rim, means for drawing the sections together or apart, a split locking ring interposed between the sectional rim and the wheel body, and pneumatic means carried by the sectional rim and adapted to expand when the sections separate so as to apply a clamping effect to the locking ring and securely hold the latter upon the wheel body the contacting surfaces of the wheel body and the locking ring being co-axially cylindrical and the contacting surfaces of the locking ring and the sectional rim being correspondingly shaped.

6. The combination of a wheel body, a sectional demountable rim having a curved face, means for drawing the sections together or apart, a split ring interposed between the sectional rim and the wheel body, said split ring having a face curved to correspond with the curvature of the face of the sectional rim, and penumatic means carried by the sectional rim for effecting a clamping pressure on the locking ring when the sections of the rim are separated, the contacting surfaces of the locking ring and the wheel body being co-axially cylindrical, together with devices for keeping the demountable rim and the wheel body relatively alined.

7. The combination of a wheel body having a cylindrical periphery, a sectional demountable rim having a curved outer face, means for drawing the sections together or apart, a split ring having a curved face and interposed between the sectional rim and the wheel body, said split ring having an inner cylindrical periphery, and penumatic means carried by the sectional rim for exerting a clamping effect on the split ring when the sections of the rim are separated.

8. The combination of a wheel body having a cylindrical edge, a clencher rim circumferentially divided into sections, screw means for drawing the sections together or apart, a split ring interposed between the sectional ring and the wheel body, and pneumatic means carried by the rim for exerting a clamping effect on the split ring and body when the sections of the rim are separated, and a series of clamping devices for keeping the demountable rim properly alined with the wheel body when mounted thereon.

9. The combination of a wheel body having a cylindrical periphery, a rim circumferentially divided into halves and having an outer curved face, screw devices engaging the sections of the rim near their meeting edges and operable to draw said edges together or force them apart, a split ring interposed between the sectional rim and the wheel body, and having a concave face corresponding to the outer face of the sectional rim and having also a cylindrical inner face corresponding to the curvature of the wheel body, and penumatic means for effecting a clamping pressure on the split ring.

10. The combination of a wheel body having a cylindrical periphery, a clencher rim divided circumferentially into halves and having its outer face curved, transverse screw devices carried by the sections of the rim at points contiguous to the meeting edges and operable for the purpose of causing said edges to be brought close together or forced apart, and a split ring interposed between the sectional rim and the wheel body, said split ring and the contacting surface of the wheel body being co-axially cylindrical.

11. The combination of a wheel, a removable rim having sections with a curved outside, a split ring between it and the wheel, having a correspondingly curved face, a series of screws for operating the sections of the rim, pneumatic means carried by the rim for securely clamping the parts together by the expansive action of the air, and a series of bolts for alining the split ring and the wheel and holding them in proper relative position laterally.

12. The combination of a fixed rim, a bisectional flanged rim having pairs of nuts, right and left hand screws operating in said nuts, a split ring between it and the fixed rim, and an inflated member held in the bisectional rim and exerting pressure against the rim flanges to clamp the said rim on the fixed rim.

In testimony whereof I affix my signature.

WILLIAM J. P. MOORE.